(12) United States Patent
Bell (10) Patent No.: US 7,039,523 B2
(45) Date of Patent: May 2, 2006

(54) METHOD OF DETERMINING SALINITY OF AN AREA OF SOIL

(75) Inventor: Darren Bell, Larrkeyah (AU)

(73) Assignee: Gecoz Pty Ltd., Cullen Bay (AU)

( * ) Notice: Subject to any disclaimer, the term of this patent is extended or adjusted under 35 U.S.C. 154(b) by 61 days.

(21) Appl. No.: 10/753,189

(22) Filed: Jan. 5, 2004

(65) Prior Publication Data

US 2004/0140815 A1 Jul. 22, 2004

(30) Foreign Application Priority Data

Jul. 5, 2002 (WO) .................. PCT/AU02/000893

(51) Int. Cl.
*G01S 13/90* (2006.01)
*G01V 3/00* (2006.01)

(52) U.S. Cl. ................ 702/2; 702/5; 702/32
(58) Field of Classification Search ............. 702/2, 702/5, 19, 32
See application file for complete search history.

(56) References Cited

U.S. PATENT DOCUMENTS 6,751,553 B1 * 6/2004 Young et al. .............. 702/5

OTHER PUBLICATIONS

Sasan S. Saatchi and Jakob J. van Zvl. Estimation of canopv water content in Konza Prairie Grasslans using synthetic aperture radar measurments during FIFE, Journal of Geophysical Research, 100,No. D12, pp. 24,481-25,496, Dec. 20, 1995, 16 pages.

Jakob J. van Zyl, Application of Cloude's target decomposition theorem to plarimetric imaging radar data, Jet Propulsion Laboratory, SPIE vol. 1748 Radar Polarimetry (1992), 8 pages.

Dr. John Chadwick and James R. Wang, Using SIR-C SAT and Cloude's Decomposition for the Determination of SOil Moisture in Vegeated Areas, 3 pages, 1996.

* cited by examiner

*Primary Examiner*—Donald McElheny, Jr.
(74) *Attorney, Agent, or Firm*—Ray K. Shahani, Esq.

(57) ABSTRACT

A method of determining the salinity of an area of soil includes providing signal data from a radar scan of the area of soil. Improved vegetation correction is applied to the signal data using a Cloude decomposition method or a "xhv" method. In some circumstances existing vegetation correction methods are used and a synergistically improved corrected obtained. The corrected data is then inverted to determine the magnitude of the dielectric values. Salinity levels are calculated from each of the imaginary component of dielectric values.

29 Claims, 9 Drawing Sheets

KEY for Figure 8.

☐ Water or unclassified    ▨ Class 2 Soils

■ Class 0 Soils            ▨ Class 3 Soils

▨ Class 1 Soils            ■ Class 4 Soils

Figure 8. Depicts the density sliced salinity maps for the (a) CM without vegetation correction, (b) CM with the Taylor vegetation correction method (CM(TVC)) and (c) CM with the developed vegetation correction (CM(VC2)).

Figure. 9.

METHOD OF DETERMINING SALINITY OF AN AREA OF SOIL

REFERENCE TO RELATED APPLICATION

This Application is related to Patent Cooperation Treaty (PCT) International Application No. PCT/AU02/00893 filed Jul. 5, 2002 entitled METHOD OF DETERMINING SALINITY OF AN AREA OF SOIL, which is incorporated herein by reference in its entirety, and claims any and all benefits to which it is entitled therefrom. This application is being filed pursuant to 35 USC § 371, and the Preliminary Amendments contained herein have been filed in the pending PCT application.

FIELD OF THE INVENTION

The present invention relates to a method of determining salinity of an area of soil from a radar scan of the area of soil.

BACKGROUND OF THE INVENTION

The effects of salinity on soil have great ecological and economic effects. Determining salinity levels of soil is useful to identify areas to avoid developing and/or rehabilitate. A convenient mechanism for surveying large areas of land is synthetic aperture radar (SAR). SAR data can be collected from aircraft or from spacecraft. Polarimetric SAR has the ability to be acquired under cloudy conditions and is sensitive to the dielectric constant of the soil. It is known that the dielectric constant ($\in$) is indicative of the salinity level of the soil. Electrical conductivity is another indicator of the salinity level of soil. The dielectric constant influences the return signal of a radar beam.

The dielectric constant is a complex number. The real part of the dielectric constant ($\Re(\in)$) is known as the permittivity and the imaginary part ($\Im(\in)$) is known as loss factor. The real component is a good discriminator for moisture level of soil, while the imaginary component is used as a discriminator for soil salt content. It is known to be able to determine the dielectric constant from a scattering matrix containing information on the scattering intensity from different polarisations, phase shifts and correlation co-efficient data of the return signal of polarimetric synthetic aperture radar. The polarisations are based on the transmit/receive orientations of the electromagnetic wave. All bands (frequencies) are transmitted and received in horizontal (H) and vertical (V) orientations. Thus the recorded data includes the power level returned for orientations H-H, H-V, V-H and V-V for each frequency. A dielectric constant inversion algorithm may be used to convert the polarimetric SAR data to provide dielectric values which can then in turn be used to determine salinity levels.

Often the area scanned by the SAR scans are covered with vegetation. In areas with no cover or semi-vegetation the abovementioned technique is relatively robust. However sometimes areas are covered in significant vegetation, which can have an effect on the return radar signal and thus the data collected. In particular the signal is attenuated or has double bounce characteristics which are not conducive to inversion using the abovementioned techniques.

As a precursor to the present invention a technique suggested by Taylor et al in *Characterisation of saline soils using airborne radar imagery, Remote Sens. Environ.* (1996), 57, 127–142, improved the estimation of the dielectric constant received from the SAR data. This technique improved the accuracy of some types of ground cover but not others.

An object of the present invention is to provide improved salinity results based on radar data for a greater range of ground cover types.

ADVANTAGES AND SUMMARY OF THE INVENTION

According to the present invention there is provided a method of determining the salinity of an area of soil including the steps of:

providing signal data from a radar scan of the area of soil;

providing field collected data representative of the salinity of discrete points within the area;

applying vegetation correction to the signal data including:

evaluating the Cloude decomposition of the signal data to determine eigenvalues;

calculating parameters of a characteristic equation by non-linear regression from the collected data, the eigenvalues and the signal data;

and correcting the signal data using the calculated parameters in the characteristic equation;

inverting the corrected data to determine the magnitude of the imaginary dielectric values;

and calculating the salinity level from each of the dielectric values.

Preferably the Cloude decomposition is evaluated from C, L and P radar bands.

Preferably the first, second and third eigenvalues are calculated for each of the radar bands.

Preferably the signal data is in the form of ratios of horizontally polarised transmission scattering co-efficient to vertically polarised received scattering co-efficient ($\sigma_{HH} \div \sigma_{VV}$).

Preferably the first eigenvalue is calculated by determining the result of:

$$\frac{\left(\sigma_{VV} + \sigma_{HH} + \sqrt{(\sigma_{VV} + \sigma_{HH})^2 + 4 \times \left(\sqrt{(\sigma_{RHHVV})^2 + (\sigma_{\Im HHVV})^2}\right)^2}\right)}{2}$$

Preferably the second eigenvalue is calculated from the result of:

$$\frac{\left(\sigma_{VV} + \sigma_{HH} - \sqrt{(\sigma_{VV} - \sigma_{HH})^2 + 4 \times \left(\sqrt{(\sigma_{RHHVV})^2 + (\sigma_{\Im HHVV})^2}\right)^2}\right)}{2}$$

Preferably the third eigenvalue is calculated as $\sigma_{HV}$.

Preferably the signal data is provided in the form of an air SAR stokes matrix.

Preferably the field collected data is in the form of a soil conductivity.

Preferably the process of inverting the corrected data to determine the magnitude of the dielectric values is to use a Physical Optics (POM) model if the angle of incidence is less than 35° and a Small Perturbation (SPM) model if the angle of incidence is greater than or equal to 35° or use an Integral Equation Method (IEM) for the whole image scene. Preferably the magnitude of the dielectric value for POM and SPM models are determined by a lookup table from the ratios of scattering coefficients. Preferably the real component of the dielectric value is determined from the ratios of scattering co-efficients using a Dubois Model (DM). Preferably the imaginary dielectric constant is calculated by taking the square root of the square of the value determined by the POM/SPM or the IEM minus the square of the real component of the dielectric value, determined by the DM, that is:

$$\sqrt{|\in_{(POM/SPMorIEM)}|^2 - (\Re(\in))^2}$$

Preferably the characteristic equation is in the form of:

$(\sigma_{HH} + \sigma_{VV})_{(vegetation\ corrected)} = (ax_1 + bx_2 + cx_3 + dx_4 + ex_5 + fx_6 + gx_7 + hx_8 + ix_9 + j) \times (\sigma_{HH} - 3\sigma_{HV}) \div (\sigma_{VV} - 3\sigma_{HV})$.

Preferably a preliminary vegetation correction is applied to the signal data.

Preferably the preliminary vegetation correction is using the signal data to provide a new scattering co-efficient ratio in the form of $(\sigma_{HH} - 3\sigma_{HV}) \div (\sigma_{VV} - 3\sigma_{HV})$.

Alternatively the preliminary vegetation correction includes:

determining a ratio, x, of $\sigma_{HH}$ divided by $\sigma_{HV}$ for each data point in the C band;

and calculating corrected data for each data point in the L band according to the formula $(\sigma_{HH} - x.\sigma_{HV})/(\sigma_{VV} - x.\sigma_{HV})$, where $\sigma_{HH}$ is horizontally polarised transmitted/received scattering co-efficient, $\sigma_{HV}$ is horizontally-vertically polarised transmitted/received scattering co-efficient and $\sigma_{VV}$ is vertically polarised transmitted/received scattering co-efficient.

Preferably the preliminary vegetation corrected data is compared to the vegetation corrected data, with data points that are synergistically greater being retained.

Preferably the initial signal data undergoes a speckle reduction process. Preferably data is excluded where the models are not valid. Preferably the inverted dielectric values undergoes a speckle reduction filter.

According to another aspect the present invention there is provided a method of determining the salinity of an area of soil including the steps of:

providing signal data from a radar scan of the area of soil, the radar scan including L band data;

the data in the form of a polarised scattering co-efficient;

applying vegetation correction to the signal data including:

determining a ratio, x, of $\sigma_{HH}$ divided by $\sigma_{HV}$ for each data point in the C band;

and calculating corrected data for each data point in the L band according to the formula $(\sigma_{HH} - x.\sigma_{HV})/(\sigma_{VV} - x.\sigma_{HV})$, where $\sigma_{HH}$ is horizontally polarised transmitted/received scattering co-efficient, $\sigma_{HV}$ is horizontally-vertically polarised transmitted/received scattering co-efficient and $\sigma_{VV}$ is vertically polarised transmitted/received scattering co-efficient;

inverting the corrected data to determine the magnitude of the imaginary dielectric values; and calculating the salinity level from each of the dielectric values.

Preferably the signal data is provided in the form of an air SAR stokes matrix.

Preferably the process of inverting the corrected data to determine the magnitude of the dielectric values is to use a Physical Optics (POM) model if the angle of incidence is less than 35° and a Small Perturbation (SPM) model if the angle of incidence is greater than or equal to 35° or use an Integral Equation Method (IEM) for the whole image scene. Preferably the magnitude of the dielectric value for POM and SPM models are determined by a lookup table from the ratios of scattering coefficients. Preferably the real component of the dielectric value is determined from the ratios of scattering co-efficients using a Dubois Model (DM). Preferably the imaginary dielectric constant is calculated by taking the square root of the square of the value determined by the POM/SPM or the IEM minus the square of the real component of the dielectric value, determined by the DM, that is:

$$\sqrt{|\in_{(POM/SPMorIEM)}|^2 - (\Re(\in))^2}$$

Preferably the initial signal data undergoes a speckle reduction process. Preferably data is excluded where the models are not valid. Preferably the inverted dielectric values undergoes a speckle reduction filter.

BRIEF DESCRIPTION OF THE DRAWINGS

In order to provide a better understanding, a preferred embodiment of the present invention will now be described, in detail, by way of example only, with reference to the accompanying drawings, in which.

and

DETAILED DESCRIPTION OF THE PREFERRED EMBODIMENT

Figure 1:
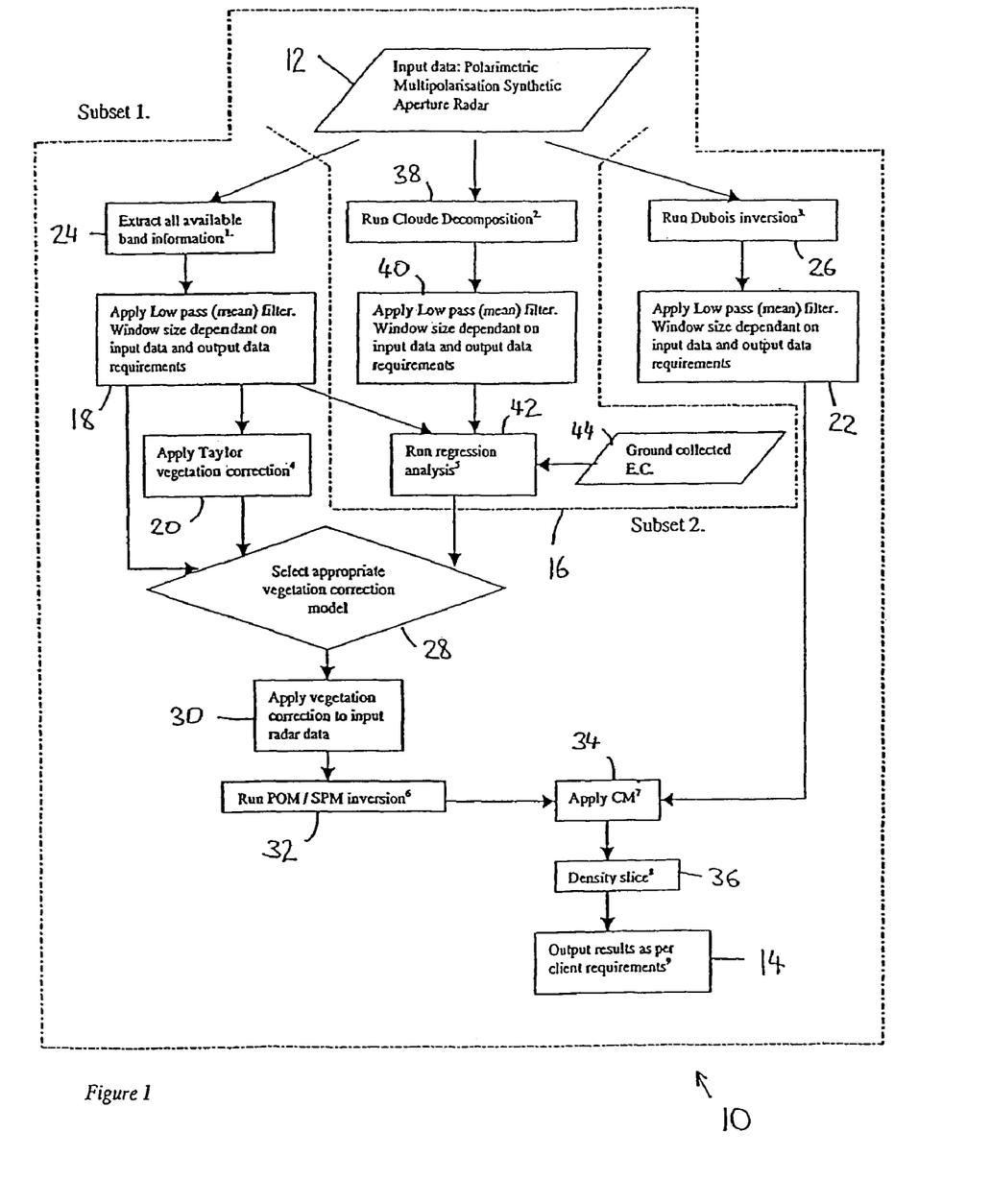
FIG. 1 is a schematic flow diagram of a method of determining the salinity of an area of soil in accordance with the present invention.

Referring to FIG. 1, a preferred method of determining salinity of an area of soil is indicated by 10. Initially input data is collected at 12 from a synthetic aperture radar scan of the area of soil. The data undergoes an extraction process at 24 to select a specific band of radar most suitable for recognition of the magnitude of the dielectric constant of the soil being scanned. The raw data collected is in the form of Air SAR Stokes matrix. The data is then put in the form of ratios of horizontally polarised transmission co-efficient to vertically polarised received scattering co-efficients, ie. ($\sigma_{HH} \div \sigma_{VV}$) This will be referred to as non-vegetation corrected data. A first vegetation correction is applied to the data in the form of a Taylor vegetation correction at 20, ie. ($\sigma_{HH} - 3\sigma_{HV}) \div (\sigma_{VV} - 3\sigma_{HV}$). This produces first vegetation corrected data.

A second vegetation correction is applied by calculating the eigenvalues using a Cloude decomposition of the raw data at 38. Field collected data is obtained at 44. A regression analysis is conducted to determine characteristic parameters of a characteristic equation of the data. The equation is then used to recalculate (second) vegetation corrected data. The non-vegetation corrected data, the first vegetation corrected data and the second vegetation corrected data then undergo a synergistic selection process at 28. The synergistically selected data is then inverted at 32 using a process of small perturbation, physical optics or integral equation models to produce the magnitude of the complex dielectric value.

The input data 12 is also subjected to a Dubois Model inversion at 26 which determines the real component of the dielectric constant. From the magnitude of the complex dielectric constant and the real component of the complex dielectric constant, the imaginary component of the dielectric constant is calculated at 34 which is indicative of the soil salinity. This produces an output that may be in the form of a salinity map at 14.

Figure 2:
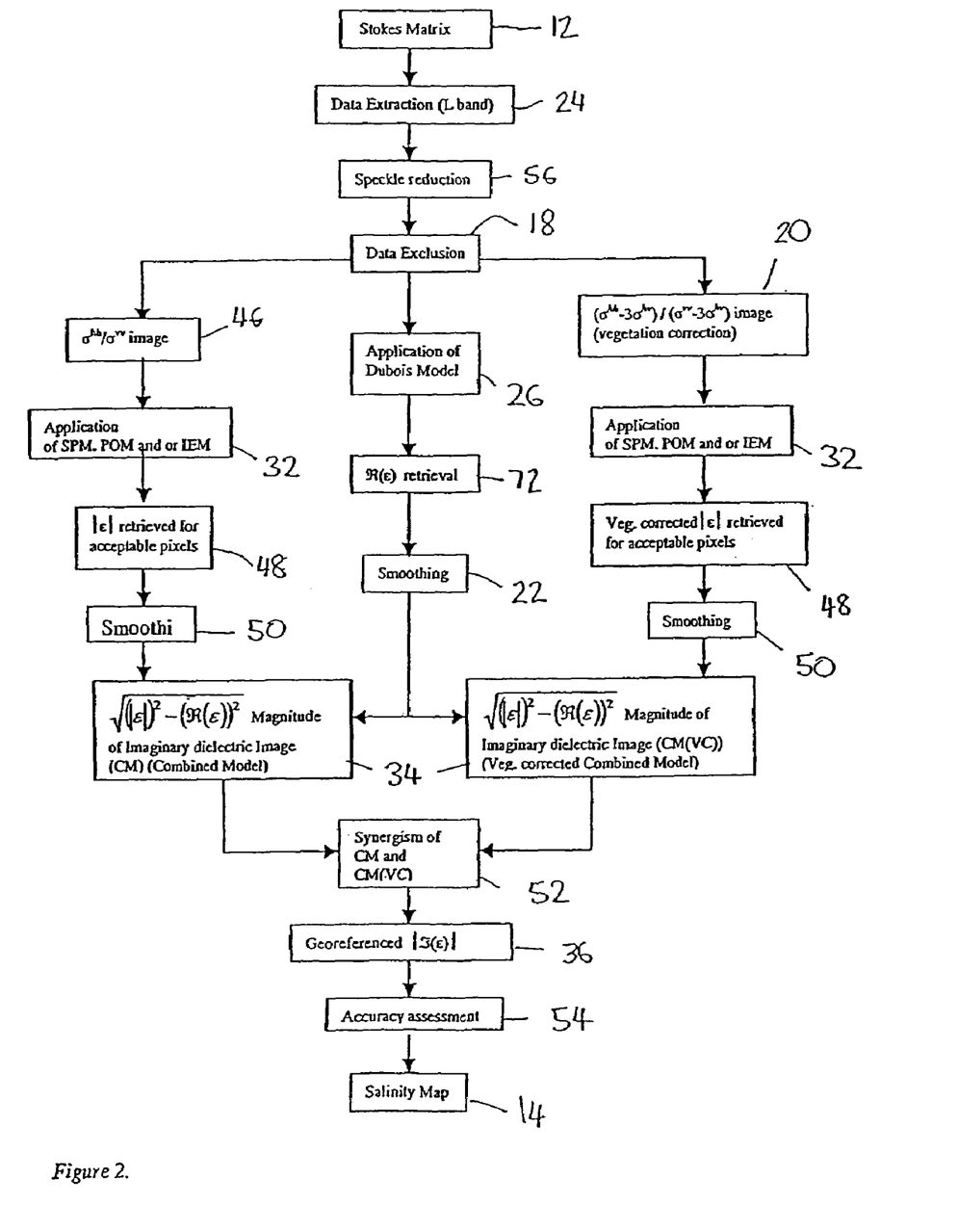
FIG. 2 is a schematic representation of sub-set 1 of FIG. 1, in more detail.
Figure 3:
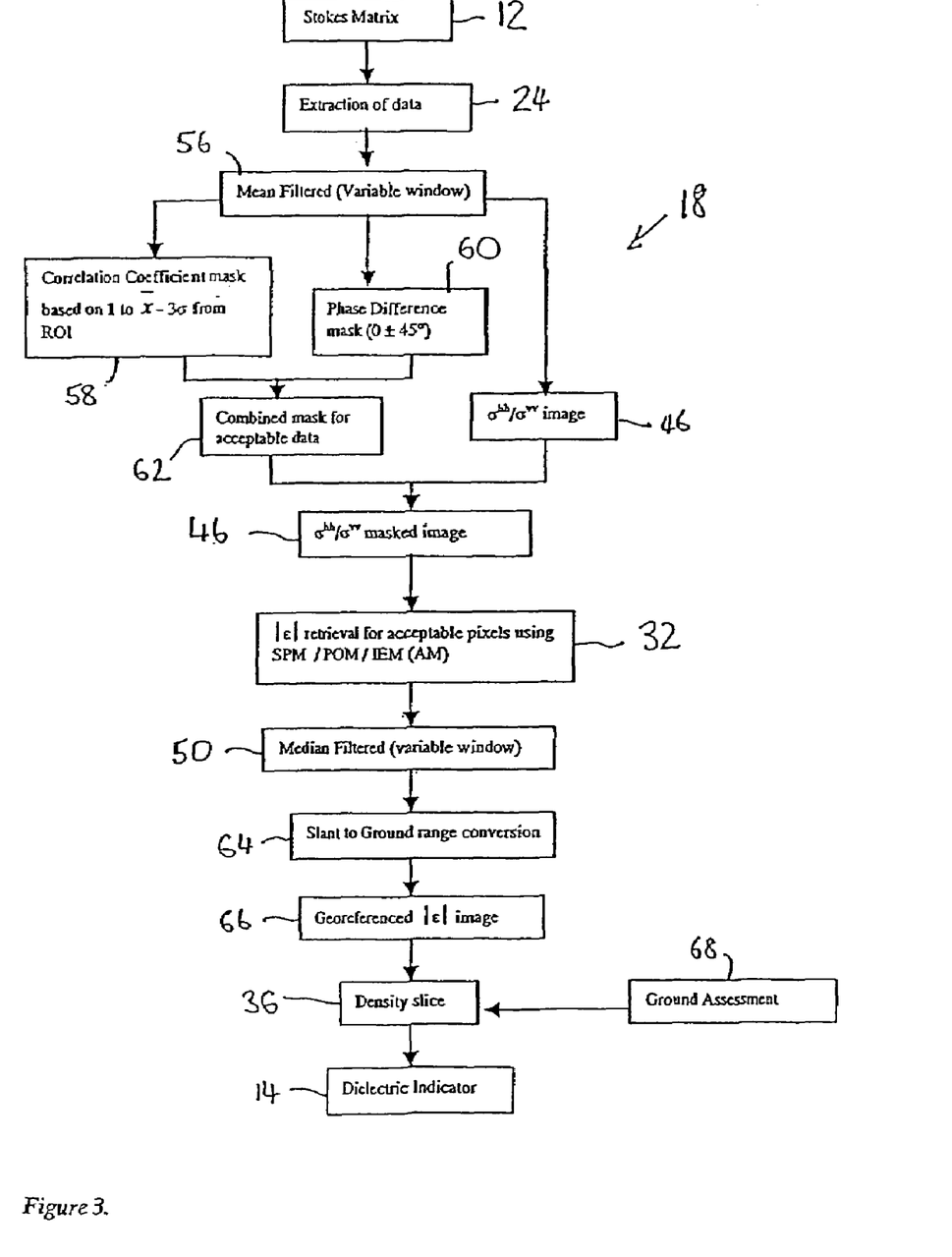
FIG. 3 is a schematic flow diagram showing additional details of some of the steps in FIG. 2.

Referring to FIGS. 2 and 3, the input data is collected from polarimetric SAR data in the form of a stokes matrix. This data includes the scattering intensity for each polarisation, the phase shift and correlation co-efficient for a number of radar bands, particularly P, L and C bands. From this data matrix L band data is extracted at 24. A process of speckle reduction is conducted at 56 with the 3×3 mean or Lee filter. Data points for which the models are not valid are then excluded at 18. A cut-off value r is calculated according to the formula:

$$r = Ma \langle S_{HH} S^*_{VV} \rangle \div \sqrt{(\langle S_{HH} S^*_{HH} \rangle \cdot \langle S_{VV} S^*_{VV} \rangle)};$$

with r being the correlation co-efficient, S being the Stokes matrix and Ma is the magnitude.

Any values of the correlation co-efficient r exceeding 3σ below the mean are deemed unsuitable at 58. Data points for the high correlation co-efficient require the co-polarised phase difference to be close to 0 as this indicates a single bounce data point. The phase difference is calculated ($\phi$)=arctan($\sigma \Im_{(HHVV)} \div \sigma \Re_{(HHVV)}$); $\sigma \Re_{(HHVV)} > 0$.

Data points with the phase difference outside ±45° were also excluded at 0. An acceptable data mask is created at 62 and applied to the non vegetation corrected data at 46.

A system of inversion is then selected according to the incident angle at 32. With an incidence angle of less than 35° the physical optics model (POM) is used and with an incidence angle greater than 35° small perturbation model (SPM) is used. Alternatively, the integral equation method (IEM) is used for the whole data set. These models are independent of surface roughness. Thus the scattering ratio co-efficient is independent of surface roughness allowing for the extraction of the dielectric constant. The small perturbation model (SPM) defines the ratio as:

$$\frac{\sigma_{HH}}{\sigma_{VV}} = \frac{\left(\varepsilon \cos\theta_i + \sqrt{\varepsilon - \sin^2\theta_i}\right)^4}{\left(\cos\theta_i + \sqrt{\varepsilon - \sin^2\theta_i}\right)^4 (\varepsilon + \varepsilon \sin^2\theta_i - \sin^2\theta_i)^2}$$

The physical optics model (POM) models the scattering ratio as co-efficient:

$$\frac{\sigma_{HH}}{\sigma_{VV}} = \frac{\left(\varepsilon \cos\theta_i + \sqrt{\varepsilon - \sin^2\theta_i}\right)^4}{\left(\cos\theta_i + \sqrt{\varepsilon - \sin^2\theta_i}\right)^4 (\varepsilon \cos^2\theta_i - \sin^2\theta_i)^2}$$

where $\in$ is the magnitude of the dielectric constant and $\theta_i$ is the incidence angle. The SPM and POM models cannot be algebraically solved and thus a lookup table is used to determine the dielectric magnitude of the dielectric value $\in$.

If the IEM is used to calculate the dielectric constant, the single backscattering coefficients are given by:

$$\sigma_{pp} = \frac{k^2}{2} \exp[-2k_z^2 s^2] \sum_{n=1}^{\infty} s^{2n} |I_{pp}^n|^2 \frac{W^n(-2k_x, 0)}{n!}$$

with $$I_{pp}^n = (2k_z)^n f_{pp} \exp[-2k_z^2 s^2] + \frac{1}{2} \{k_z^n [F_{pp}(-k_x, 0) + F_{pp}(k_x, 0)]\}$$

where pp denotes the polarisation state and $$f_{vv} = \frac{2R_v}{\cos(\theta_i)}$$

$$f_{hh} = \frac{-2R_h}{\cos(\theta_i)}$$

$$F_{vv}(-k_x, 0) + F_{vv}(k_x, 0) =$$

$$\frac{2\sin^2(\theta_i)(1+R_v)^2}{\cos(\theta_i)} \left[\left(1 - \frac{1}{\varepsilon_s}\right) + \frac{\mu_r \varepsilon_s - \sin^2(\theta_i) - \varepsilon_s \cos^2(\theta_i)}{\varepsilon_s^2 \cos^2(\theta_i)}\right]$$

$$F_{hh}(-k_x, 0) + F_{hh}(k_x, 0) =$$

-continued $$\frac{-2\sin^2(\theta_i)(1+R_h)^2}{\cos(\theta_i)}\left[\left(1-\frac{1}{\mu_r}\right)+\frac{\mu_r\varepsilon_s-\sin^2(\theta_i)-\mu_r\cos^2(\theta_i)}{\mu_r^2\cos^2(\theta_i)}\right]$$

In the above equation, $q_i$ is the angle of incidence, $R_h$ and $R_v$ are the horizontally and vertically polarised Fresnel reflection coefficients; $e_s$ and $m_r$ are the relative permittivity and permeability of the surface; s is the standard deviation of the surface height; k is the wave number; $k_z = k \cos(q_i)$; $k_x = k \sin(q_i)$; and $W^n$ is the Fourier transform of the nth power of a known surface correlation function.

This leads to a general improved inversion, using the combination of co-polarised measurements.

The result then undergoes a smoothing process to remove speckle at 50. Vegetation corrected data uses Taylor vegetation correction $(\sigma_{HH}-3\sigma_{HV})\div(\sigma_{VV}-3\sigma_{HV})$ instead of the $(\sigma_{HH}\div\sigma_{VV})$ ratio for the inversion to determine the magnitude of the dielectric constant.

From the magnitude of the dielectric constant the imaginary component can be calculated if the real component can be determined. The Dubois Model (DM) is suitable for determining the real component and thus the Dubois Model is applied at 26. The Dubois Model is valid for frequencies between 1.5 and 11 G hertz for surfaces with roughness ranging from 0.3 to 3 cm root means squared height and for an incidence angle of between 30 and 65°.

Figure 4:
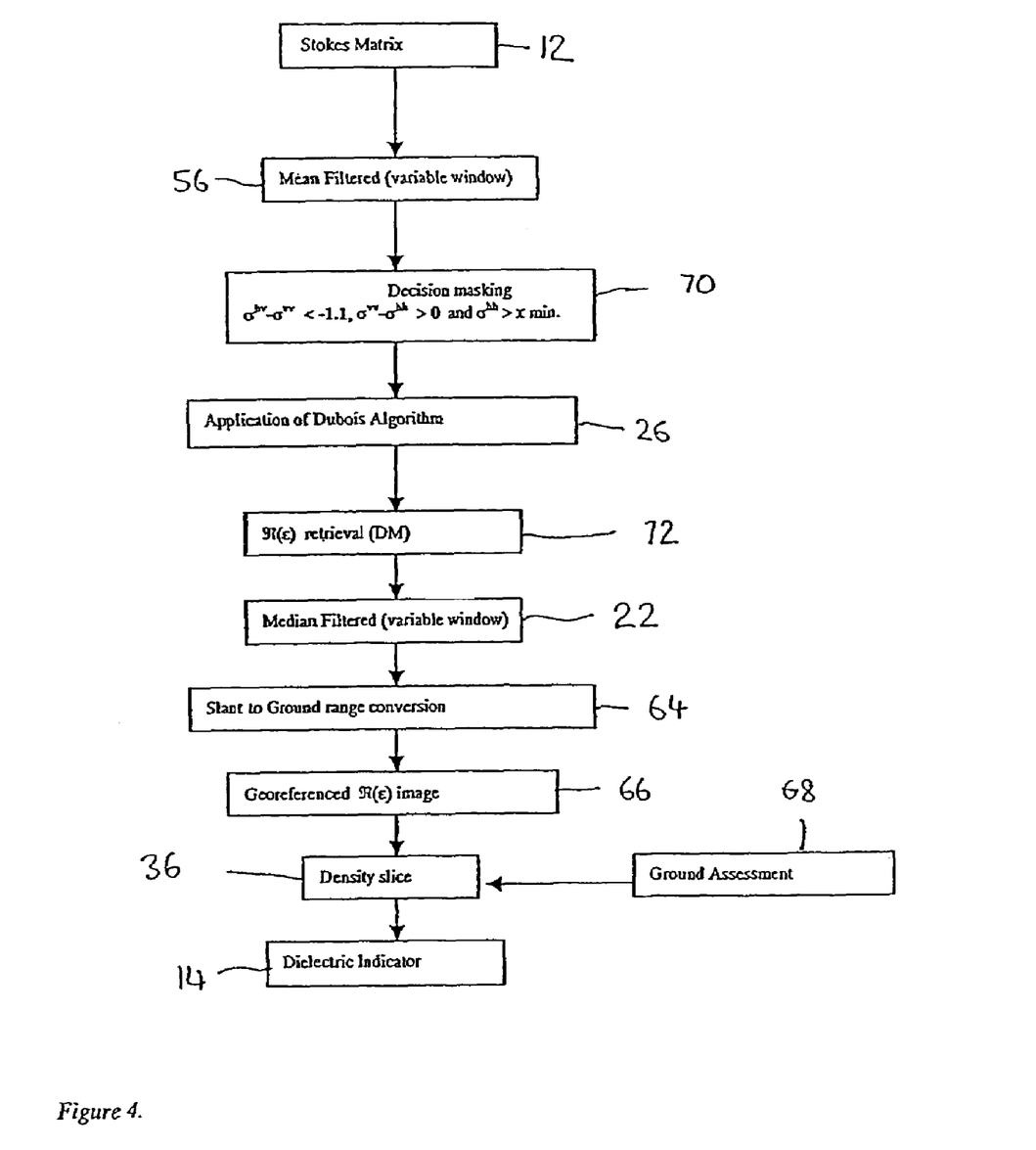
FIG. 4 is a schematic representation of part of the process of FIG. 2 shown in more detail.

Referring to FIG. 4, data from the Stokes matrix undergoes speckle filtering at 56. The data is then validated for the model at 70. The criteria for excluding data using the DM algorithm are as follows: the algorithm is only applied to the L band data where $(\sigma_{HV}-\sigma_{VV})$ is less than −1.1, $(\sigma_{VV}-\sigma_{HH})$ is greater than 0, and $\sigma_{HH}$ is greater than X minimum (X minimum=−5). The Dubois algorithm is applied at 26 to retrieve the real component of the dielectric constant 72. The Dubois Model is as follows:

$\sigma_{HH}=10^{-2.75}(\cos^{1.25}\theta_i \div \sin^5\theta_i)10^{0.028\ \Re(\in)\tan\theta_i}(kh\ \sin^{1.4}\theta_i)\lambda^{0.7}$ $\sigma_{VV}=10^{-2.35}\times(\cos^3\theta_i \div \sin\theta_i)10^{0.046\ \Re(\in)\tan\theta_i}(kh\ \sin^3\theta_i)^{1.1}\lambda^{0.7}$.

Where $\Re(\in)$ is the real part of the dielectric constant, h is the root means square height of the is the wave of number and $\lambda$ is the wavelength in centimeters surface, k.

These models are based on first order (or single bounce) same scattering mechanism targets.

From the magnitude and the real component of the imaginary dielectric models the imaginary component can be calculated as follows:

$\Im(\in)=\sqrt{|\in|^2-(\Re(\in))^2}$

This formula is applied at 34 to produce what is referred to as a combined model (CM).

The resulting data is smoothed with a 3×3 mean window median filter. Final results are converted to ground range and geo-referenced data at 36. A colour composite image may be produced of P-HH L-VV, C-HV as red, green and blue to identify sufficient ground control points with respect to the topographic maps after a slant ground range conversion 64 occurs. The ground control points are used to determine the first order polynomial for resampling to a 10×10 m (or as otherwise desired) pixel size with a means square error of less than one pixel. As a final step the images are density sliced into five equal intervals (between 0 and 100 for the SPM/POM/IEM and the DM) for comparison. These values may vary depending on the target soil conditions.

SPM models work well under wet soil conditions with DM able to be used as an indicator of soil moisture.

The SPM and POM lookup tables are restricted to values between 0 and 100 for the magnitude of the dielectric constant.

Figure 5:
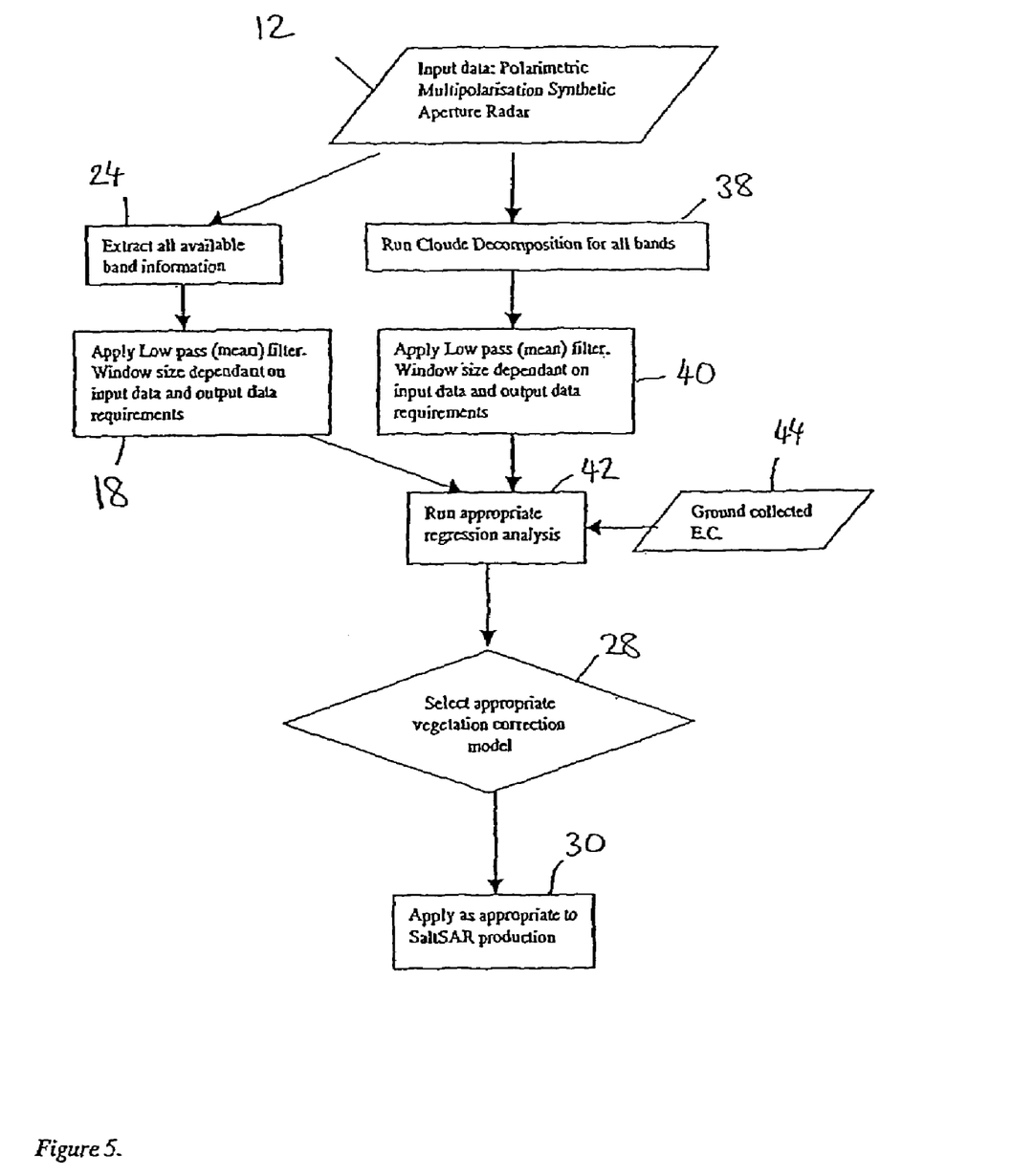
FIG. 5 is a schematic representation showing steps of sub-set 2 in more detail.

Referring to FIG. 5 from the input data on the stokes matrix 27 bands of information are provided in the compressed stokes matrix.

At 38 the cloud decomposition is evaluated from the C, L and P bands to determine the first three eigenvalues for each of the three bands. The eigenvalues for each of the bands calculated are as follows:

$$\text{First eigenvalue} = \frac{\left(\sigma_{VV}+\sigma_{HH}+\sqrt{(\sigma_{VV}+\sigma_{HH})^2}+4\times\left(\sqrt{(\sigma_{\Re HHVV})^2+(\sigma_{\Im HHVV})^2}\right)^2\right)}{2}$$

$$\text{Second eigenvalue} = \frac{\left(\sigma_{VV}+\sigma_{HH}-\sqrt{(\sigma_{VV}-\sigma_{HH})^2}+4\times\left(\sqrt{(\sigma_{\Re HHVV})^2+(\sigma_{\Im HHVV})^2}\right)^2\right)}{2}$$

Third eigenvalue = $\sigma_{HV}$.

The first and second eigenvalues are reversed if $\sigma\Re_{HHVV}$ is greater than 0.

Figure 6:
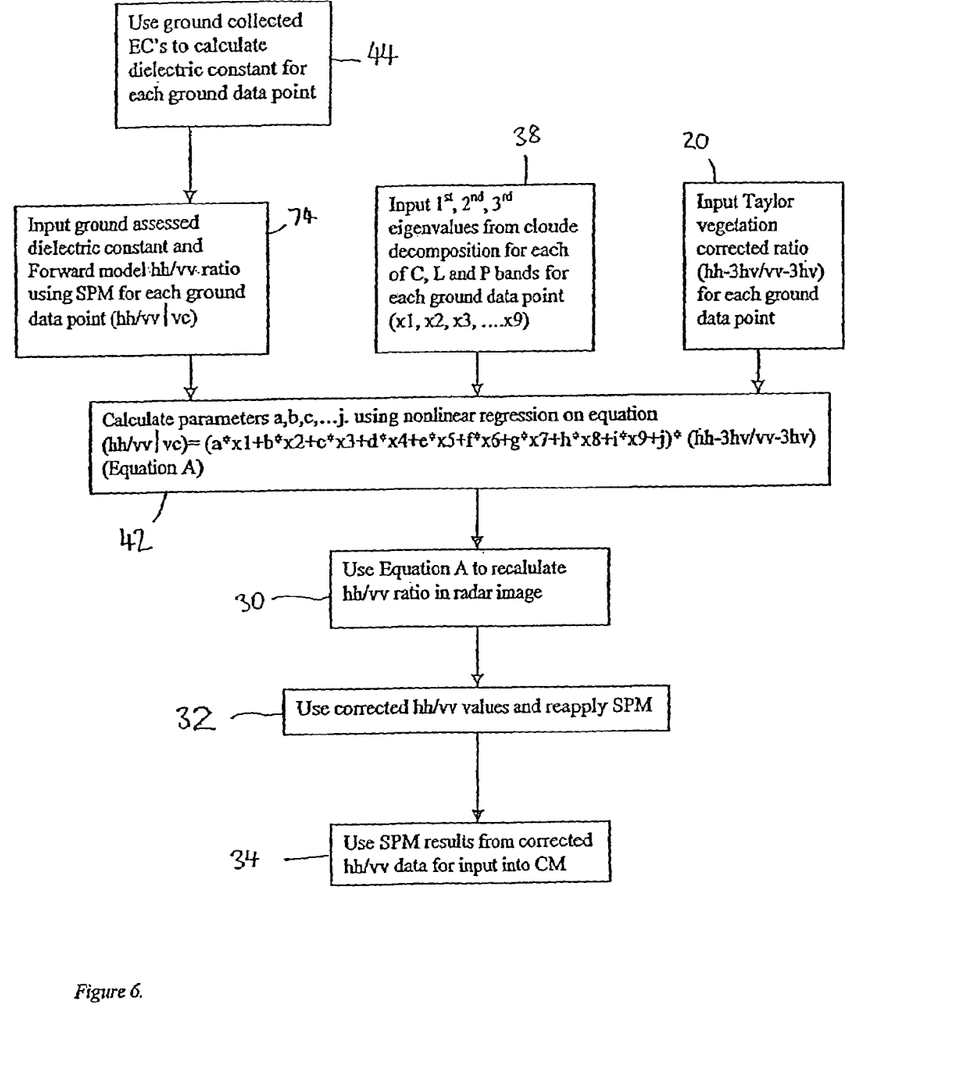
FIG. 6 is a schematic representation showing steps in FIG. 5 in more detail.

A low pass mean or Lee filter is applied at 40. Field collected electrical conductivity samples are used to determine data points of a particular salinity at 44. This data along with the Taylor (first) vegetation corrected ratio and the eigenvalues is used in a non-linear regression to determine the parameters of the following equation:

$(\sigma_{HH}\div\sigma_{VV})_{(sub-vegetation\ corrected)}=(ax_1+bx_2+cx_3+dx_4+ex_5+fx_6+gx_7+hx_8+ix_9+j)\times(\sigma_{HH}-3\sigma_{VH})\div(\sigma_{VV}-3\sigma_{VH})$ where;

the parameters calculated are a, b, c ... j and $x_i$ is the first, second and third eigenvalue from the C, L and P band Cloude decomposition respectively and $\sigma_{pp}$ indicates the back scatter polarisation.

Once this equation is calculated at 42, the equation is then used to determine vegetation corrected $\sigma_{HHVV}$ ratio which is then applied at 32 to the inversion results and which is then applied to the combined model at 34.

The non-vegetation corrected data underestimates the dielectric value for some types of ground cover whereas the first vegetation correction underestimates the dielectric value for bare ground and certain types of ground cover, particularly inundated areas covered with thick sedge and forest cover. The second vegetation correction improves the results for more ground cover types. The soils were then classified according to the following table:

| | Class | Soil Salinity: Electrical Conductivity (ms/cm) | Imaginary Dielectric Value ($\Im(\epsilon)$) |
|---|---|---|---|
| Non Saline | 0 | <2 ms/cm | <7.5 |
| Slightly Saline | 1 | 2–4 ms/cm | 5.–10.4 |
| Moderately Saline | 2 | 4–8 ms/cm | 10.4–16.1 |
| Very Saline | 3 | 8–16 ms/cm | 16.1–27.5 |
| Highly Saline | 4 | >16 ms/cm | >27.5 |

This table may vary depending on the soil type and texture.

An alternative to the Taylor method of vegetation correction is to use the $\sigma_{HV}$ to $\sigma_{HH}$ in C band. A multiplication factor (x) is calculated for each data point to satisfy the following equation:

$$\sigma_{HH} = x \cdot \sigma_{HV}$$

This 'x' factor is calculated for each pixel in the image. This multiplication factor is used in the L band image using the following expression:

$$(\sigma_{HH} - x\sigma_{HV})/(\sigma_{VV} - x\sigma_{HV})$$

This produces a copolarisation ratio image in L band that is considered "vegetation corrected", referred to as "XHV" corrected below. This new copolarisation ratio data is then used as the input into the dielectric retrieval algorthims that extract the magnitude of the dielectric constant.

This vegetation correction may be used along or compared with the Cloude decomposition vegetation corrected data to synergistically determine the better data points. The retained data then undergoes inversion to determine the dielectric values.

Figure 9:
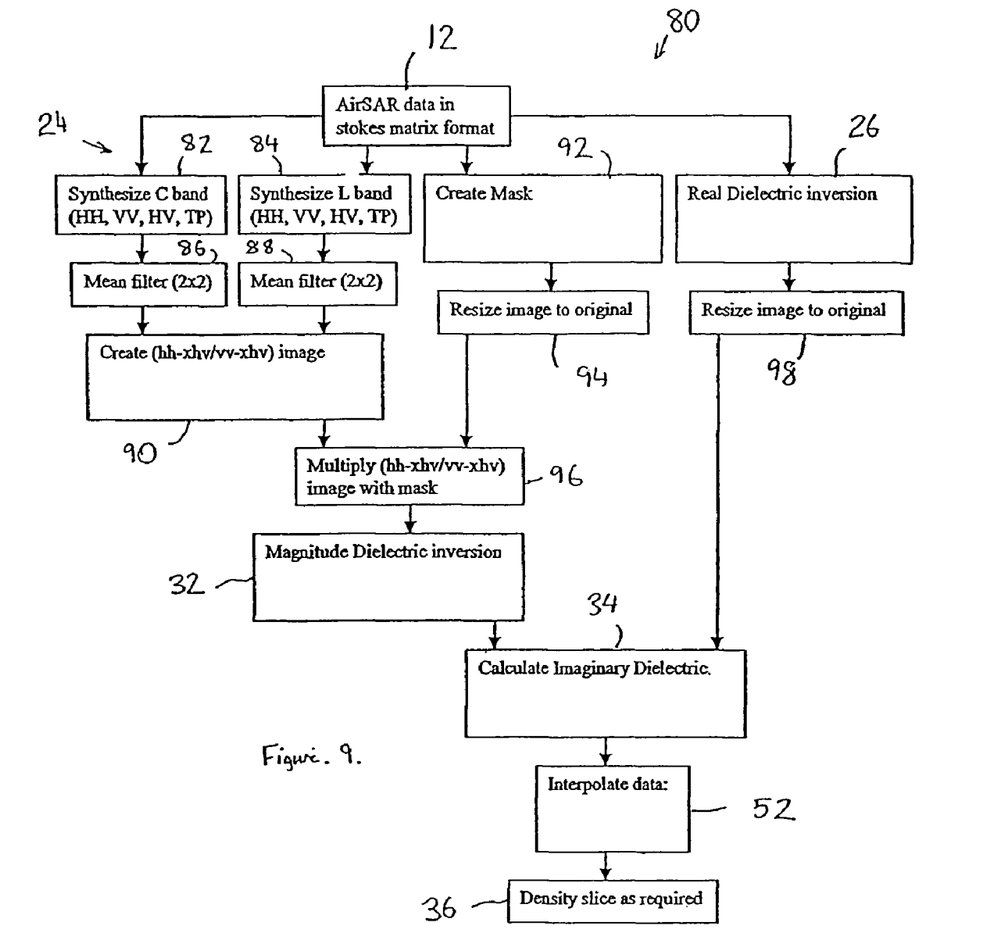
FIG. 9 is a schematic flow diagram of an alternative method of determining salinity of an area of soil according to the present invention.

FIG. 9 shows an alternative method of determining salinity of an area of soil 80. The process of 80 begins with the collection of data in the form of stokes matrix at 12. The data undergoes an extraction process at 24 to obtain a synthesised C band data at 82 and synthesised L band data at 84. In addition a mask is created at 92 and a Dubois Model inversion is conducted at 26 as described above.

The synthesised C band data 82 undergoes a mean or Lee filtering (2×2) at 86, likewise the synthesised L band data undergoes mean or Lee filtering (2×2) at 88. A "XHV" correction co-efficient ratio of $(\sigma_{HH} - x\sigma_{HV})/(\sigma_{VV} - x\sigma_{HV})$ is created at 90 as described above. This image data is then multiplied at 96 by image mask which has been resized at 94. Magnitude dielectric inversion of the co-efficient ratio occurs at 32, using the small perturbation, physical optics or integration equation models as described above, to produce the magnitude of the complex dielectric value. The real component of the dielectric value inverted according to the Dubois Model is resized at 98 and then applied at 34 to calculate the imaginary value of the dielectric value as described above. The data is interperlated at 52 if required and density slicing applied at 36.

Data interperlation 52 may include comparing the results of the "XHV" vegetation correction to the results of the Cloude decomposition vegetation corrected data. Thus the process shown in FIG. 9 may substitute the Taylor vegetation correction shown in sub-set 1 of FIG. 1. The result being that the synergistically best data of the Cloude decomposition method and "XHV" method for each data point being retained and then used to determine the salinity level.

EXAMPLE

Figure 7:
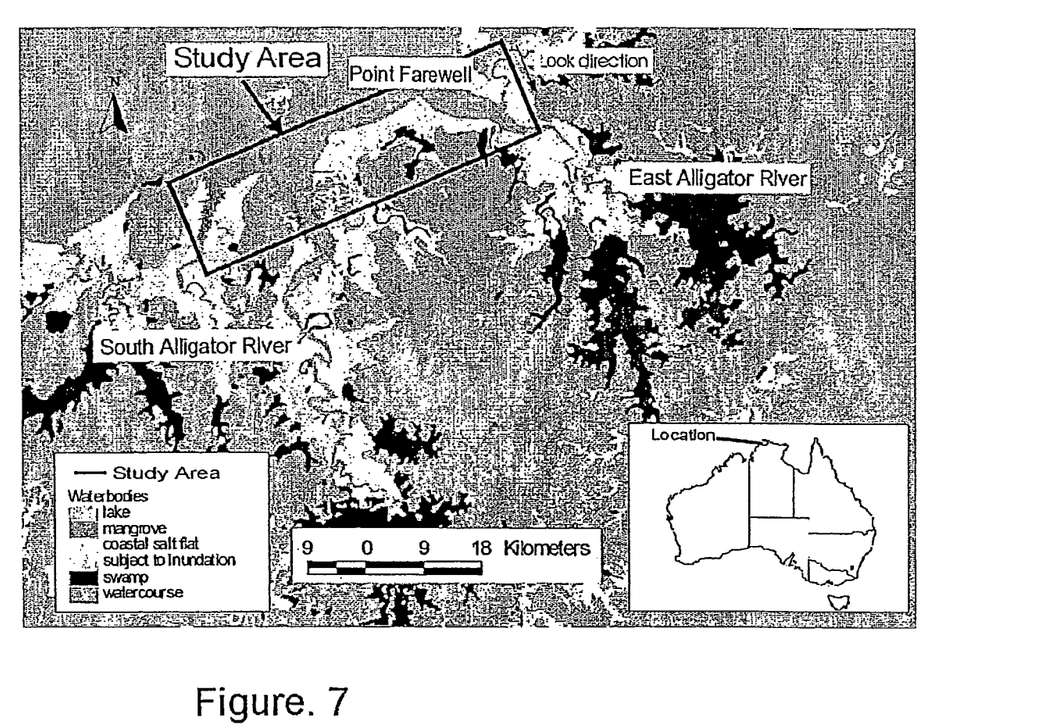
FIG. 7 is a diagram representing a study area using the method of the present invention.
Figure 8:
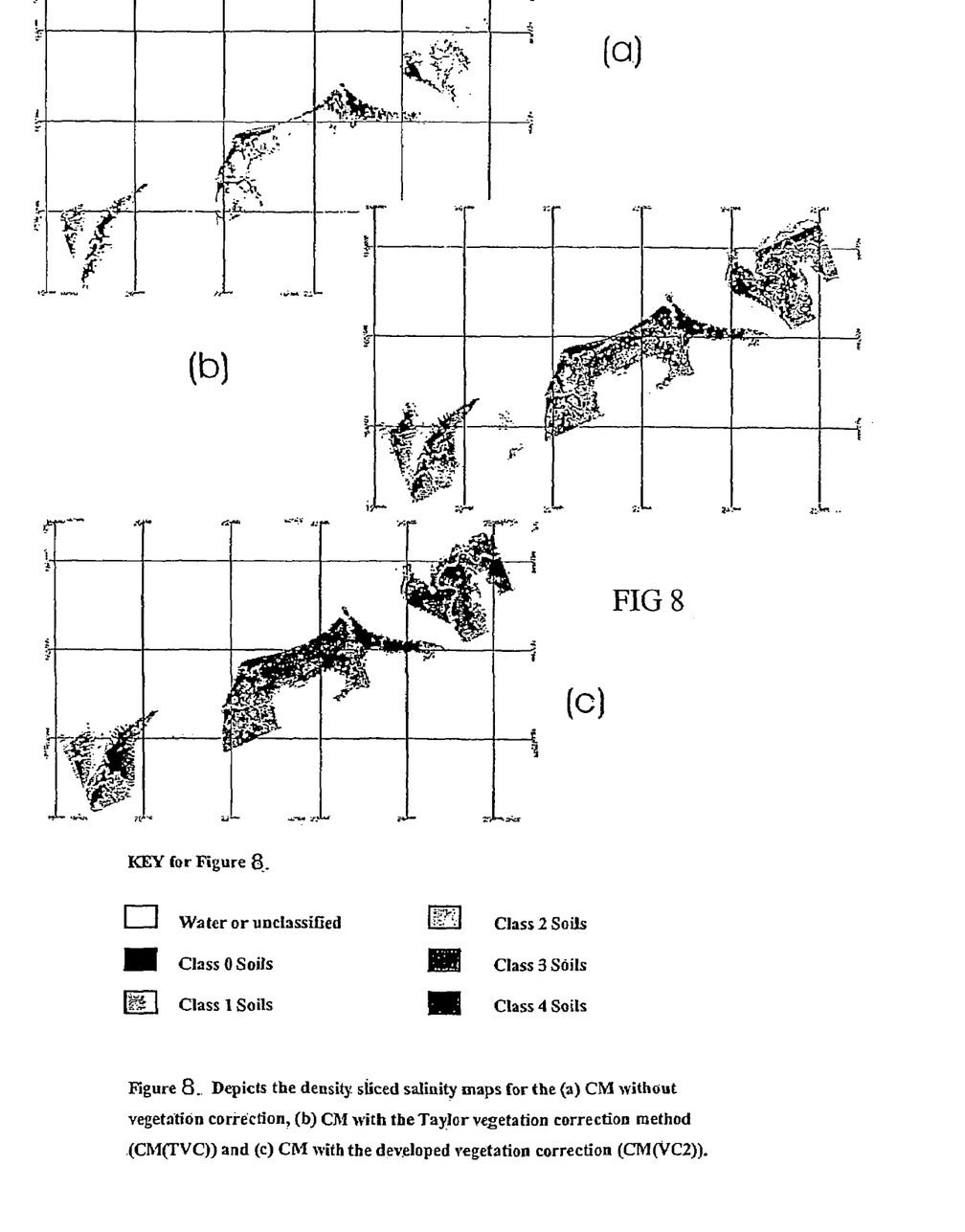
FIG. 8 is density sliced salinity maps, with FIG. 8a without vegetation correction, 8b with Taylor vegetation correction and 8c with vegetation correction according to the present invention.

An area of northern Australia was scanned at Point Farewell as indicated in FIG. 7. Referring to FIG. 8, a density sliced salinity map produced using non-vegetation corrected technique is shown in FIG. 8a. It can be seen that a large area of the map was under-estimated or areas were not detectable. In FIG. 8b more data is usable due to the use of the Taylor vegetation correction method. In FIG. 8c even more of the area of the map produced useful results due to the use of further vegetation correction in accordance with the present invention.

It can be seen that use of the vegetation correction method according to the present invention lessens the under-estimation of the dielectric value and thus the salinity value along being able to provide an estimate of a greater range of the salinity value even though the ground is covered by ground cover that other techniques cannot work around.

Modifications and variations can be made to the present invention without departing from the basic inventive concept. Such modifications may include selecting the appropriate band of radar; sourcing the radar from other sources than AIR SAR. Such modifications and variations are intended to be within the scope of the present invention the nature of which is to be determined from the foregoing description.

I claim:

1. A method of determining the salinity of an area of soil including the steps of:
   providing signal data from a radar scan of the area of soil;
   providing field collected data representative of the salinity of discrete points within the area;
   applying vegetation correction to the signal data including:
   evaluating the Cloude decomposition of the signal data to determine eigenvalues;
   calculating parameters of a characteristic equation by non-linear regression from the collected data, the eigenvalues and the signal data; and
   correcting the signal data using the calculated parameters in the characteristic equation;
   inverting the corrected data to determine the magnitude of the imaginary dielectric values; and
   calculating the salinity level from each of the dielectric values.

2. A method according to claim 1, wherein the Cloude decomposition is evaluated from C, L and P radar bands.

3. A method according to claim 1 or 2, wherein the first, second and third eigenvalues are calculated for each of the radar bands.

4. A method according to claim 1, wherein the signal data is in the form of ratios of horizontally polarised transmission scattering co-efficient to vertically polarised received scattering co-efficient $(\sigma_{HH} \div \sigma_{VV})$.

5. A method according to claim 3, wherein the first eigenvalue is calculated by determining the result of:

$$\frac{\left(\sigma_{VV}+\sigma_{HH}+\sqrt{(\sigma_{VV}+\sigma_{HH})^2+4\times\left(\sqrt{(\sigma_{\Re HHVV})^2+(\sigma_{\Im HHVV})^2}\right)^2}\right)}{2}.$$

6. A method according to claim 5, wherein the second eigenvalue is calculated from the result of:

$$\frac{\left(\sigma_{VV}+\sigma_{HH}-\sqrt{(\sigma_{VV}-\sigma_{HH})^2+4\times\left(\sqrt{(\sigma_{\Re HHVV})^2+(\sigma_{\Im HHVV})^2}\right)^2}\right)}{2}.$$

7. A method according to claim 6, wherein the third eigenvalue is calculated as $\sigma_{HV}$.

8. A method according to claim 1, wherein the process of inverting the corrected data to determine the magnitude of the dielectric values is to use a Physical Optics (POM) model if the angle of incidence is less than 35° and a Small Perturbation (SPM) model if the angle of incidence is greater than or equal to 35° or use an Integral Equation Method (IEM) for the whole image scene.

9. A method according to claim 8, wherein the magnitude of the dielectric value for POM and SPM models are determined by a lookup table from the ratios of scattering co-efficients.

10. A method according to claim 9, wherein the real component of the dielectric value is determined from the ratios of scattering co-efficients using a Dubois Model (DM).

11. A method according to claim 8, wherein the imaginary dielectric constant is calculated by taking the square root of the square of the value determined by the POM/SPM or the IEM minus the square of the real component of the dielectric value, determined by the DM, that is:

$$\sqrt{|\in_{(POM/SPMorIEM)}|^2-(\Re(\in))^2}.$$

12. A method according to claim 1, wherein the characteristic equation is in the form of $(\sigma_{HH}+\sigma_{VV})_{(vegetation\ corrected)}=(ax_1+bx_2+cx_3+dx_4+ex_5+fx_6+gx_7+hx_8+ix_9+j)\times(\sigma_{HH}-3\sigma_{HV})\div(\sigma_{VV}-3\sigma_{HV})$.

13. A method according to claim 1, wherein a preliminary vegetation correction is applied to the signal data.

14. A method according to claim 13, wherein the preliminary vegetation correction is using the signal data to provide a new scattering co-efficient ratio in the form of $(\sigma_{HH}-3\sigma_{HV})\div(\sigma_{VV}-3\sigma_{HV})$.

15. A method according to claim 13, wherein the preliminary vegetation correction includes:
  determining a ratio, x, of $\sigma_{HH}$ divided by $\sigma_{HV}$ for each data point in the C band; and
  calculating corrected data for each data point in the L band according to the formula $(\sigma_{HH}-x.\sigma_{HV})/(\sigma_{VV}-x.\sigma_{HV})$, where $\sigma_{HH}$ is horizontally polarised transmitted/received scattering co-efficient, $\sigma_{HV}$ is horizontally-vertically polarised transmitted/received scattering co-efficient and $\sigma_{VV}$ is vertically polarised transmitted/received scattering co-efficient.

16. A method according to claim 13, wherein the preliminary vegetation corrected data is compared to the vegetation corrected data, with data points that are synergistically greater being retained.

17. A method of determining the salinity of an area of soil including the steps of:
  providing signal data from a radar scan of the area of soil, the radar scan including L band data;
  the data in the form of a polarised scattering co-efficient;
  applying vegetation correction to the signal data including:
    determining a ratio, x, of $\sigma_{HH}$ divided by $\sigma_{HV}$ for each data point in the C band; and
    calculating corrected data for each data point in the L band according to the formula $(\sigma_{HH}-x.\sigma_{HV})/(\sigma_{VV}-x.\sigma_{HV})$, where $\sigma_{HH}$ is horizontally polarised transmitted/received scattering co-efficient, $\sigma_{HV}$ is horizontally-vertically polarised transmitted/received scattering co-efficient and $\sigma_{VV}$ is vertically polarised transmitted/received scattering co-efficient;
  inverting the corrected data to determine the magnitude of the imaginary dielectric values; and
  calculating the salinity level from each of the dielectric values.

18. A method according to claim 17, wherein the process of inverting the corrected data to determine the magnitude of the dielectric values is to use a Physical Optics (POM) model if the angle of incidence is less than 35° and a Small Perturbation (SPM) model if the angle of incidence is greater than or equal to 35° or use an Integral Equation Method (LEM) for the whole image scene.

19. A method according to claim 18, wherein the magnitude of the dielectric value for POM and SPM models are determined by a lookup table from the ratios of scattering co-efficients.

20. A method according to claim 19, wherein the real component of the dielectric value is determined from the ratios of scattering co-efficients using a Dubois Model (DM).

21. A method according to claim 20, wherein the imaginary dielectric constant is calculated by taking the square root of the square of the value determined by the POM/SPM or the IBM minus the square of the real component of the dielectric value, determined by the DM, that is:

$$\sqrt{|\in_{(POM/SPMorIEM)}|^2-(\Re(\in))^2}.$$

22. A system for determining the salinity of an area of soil comprising:

a input for receiving signal data from a radar scan of the area of soil and for receiving collected field data representative of the salinity of discrete points within the area;

a device configured to apply vegetation correction to the received signal data, said device comprising a processor configured to evaluate the Cloude decomposition of the signal data to determine eigenvalues, said processor further configured to calculate parameters of a characteristic equation by non-linear regression from the collected field data, the eigenvalues and the signal data, said processor further configured to correct the signal data using the calculated parameters in the characteristic equation, said processor further configured to invert the corrected data to determine the magnitude of imaginary dielectric values, and calculate salinity level data from each of the imaginary dielectric values; and an output for providing the salinity level data.

23. A system according to claim 22, further comprising a preprocessor configured to apply a preliminary vegetation correction to the signal data.

24. A system according to claim 23, wherein device for applying vegetation correction is configured to compare the preliminary vegetation corrected data to the vegetation corrected data, and to retain data points that are synergistically greater.

25. A system for determining the salinity of an area of soil comprising:

an input for receiving signal data from a radar scan of the area of soil, the radar scan including L band data, the data in the form of a polarised scattering co-efficient;

a device configured to apply vegetation correction to the signal data, said device comprising a processor configured to determine a ratio, x, of $\sigma_{HH}$ divided by $\sigma_{HV}$ for each data point in the C band, and calculate corrected data for each data point in the L band according to the formula $(\sigma_{HH}-x.\sigma_{HV})/(\sigma_{VV}-x.\sigma_{HV})$;

said processor further configured to invert the corrected data to determine the magnitude of imaginary dielectric values and calculate salinity level data from each of the imaginary dielectric values; an output for providing the salinity level data, where $\sigma_{HH}$ is horizontally polarised transmitted/received scattering co-efficient, $\sigma_{HV}$ is horizontally-vertically polarised transmitted/received scattering co-efficient and $\sigma_{VV}$ is vertically polarised transmitted/received scattering co-efficient.

26. A device for determining the salinity of an area of soil by applying a vegetation correction to signal data from a radar scan of the area of soil comprising;

a processor configured to evaluate the Cloude decomposition of the signal data to determine eigenvalues;

said processor further configured to calculate parameters of a characteristic equation by non-linear regression from collected field data representative of the salinity of discrete points within the area, the eigenvalues and the signal data;

said processor further configured to correct the signal data using the calculated parameters in the characteristic equation;

said processor further configured to invert the corrected data to determine the magnitude of imaginary dielectric values, and calculate the salinity level from each of the imaginary dielectric values.

27. A device for determining the salinity of an area of soil by applying vegetation correction to the signal data from a radar scan of the area of soil, by the radar scan including L band data, the data in the form of a polarised scattering co-efficient, said device comprising;

a processor configured to determine a ratio, x, of $\sigma_{HH}$ divided by $\sigma_{HV}$ for each data point in the C band, and calculate corrected data for each data point in the L band according to the formula $(\sigma_{HH}-x.\sigma_{HV})/(\sigma_{VV}-x.\sigma_{HV})$;

said processor further configured to invert the corrected data to determine the magnitude of imaginary dielectric values and calculate salinity level data from each of the imaginary dielectric values, where $\sigma_{HH}$ is horizontally polarised transmitted/received scattering co-efficient, $\sigma_{HV}$ is horizontally-vertically polarised transmitted/received scattering co-efficient and $\sigma_{VV}$ is vertically polarised transmitted/received scattering co-efficient.

28. A computer program for controlling a computer to determine the salinity of an area of soil by:

inputting signal data from a radar scan of an area of soil;

inputting field collected data representative of the salinity of discrete points within the area;

applying vegetation correction to the signal data including:
    evaluating the Cloude decomposition of the signal data to determine eigenvalues;
    calculating parameters of a characteristic equation by non-linear regression from the calculated data, the eigenvalues and the signal data; and
    correcting the signal data using the calculated parameters in the characteristic equations;

inverting the corrected data to determine the magnitude of the imaginary dielectric values;

calculating the salinity level from each of the dielectric values; and outputting the calculated salinity levels.

29. A computer program product embodied in a computer readable storage medium for controlling a computer to determine the salinity of an area of soil comprising a computer program for controlling a computer to:

input signal data from a radar scan of an area of soil;

input field collected data representative of the salinity of discrete points within the area;

apply vegetation correction to the signal data including:
    evaluating the Cloude decomposition of the signal data to determine eigen values;
    calculating parameters of a characteristic equation by non-linear regression from the calculated data, the eigen values and the signal data; and
    correcting the signal data using the calculated parameters in the characteristic equations;

invert the corrected data to determine the magnitude of the imaginary dielectric values;

calculate the salinity level from each of the dielectric values; and output the calculated salinity levels.

* * * * *

UNITED STATES PATENT AND TRADEMARK OFFICE
CERTIFICATE OF CORRECTION

PATENT NO.        : 7,039,523 B2
APPLICATION NO. : 10/753189
DATED             : May 2, 2006
INVENTOR(S)       : Bell It is certified that error appears in the above-identified patent and that said Letters Patent is hereby corrected as shown below:

CORRECTIONS TO THE SPECIFICATION

1. Please add the following line to (30) Foreign Application Priority Data portion:
   Jul. 6, 2001          (AU)          ............. PR6184

2. Please replace the paragraph starting at column 1, line 6, with the following paragraph:
   ~~This Application is related to Patent Cooperation Treaty (PCT) International Application No. PCT/AU02/00893 filed July 5, 2002 entitled METHOD OF DETERMINING SALINITY OF AN AREA OF SOIL, which is incorporated herein by reference in its entirety, and claims any and all benefits to which it is entitled therefrom. This application is being filed pursuant to 35 USC § 371.~~

This Application is related to Patent Cooperation Treaty (PCT) International Application No. PCT/AU02/00893 filed July 5, 2002 entitled METHOD OF DETERMINING SALINITY OF AN AREA OF SOIL, which is also related to Australian Application No. PR6184 filed July 6, 2001, which is incorporated herein by reference in its entirety, and claims any and all benefits of priority filing date to which it is entitled therefrom. This application is being filed pursuant to 35 USC § 371.

UNITED STATES PATENT AND TRADEMARK OFFICE
CERTIFICATE OF CORRECTION

PATENT NO.       : 7,039,523 B2
APPLICATION NO.  : 10/753189
DATED            : May 2, 2006
INVENTOR(S)      : Bell It is certified that error appears in the above-identified patent and that said Letters Patent is hereby corrected as shown below:

CORRECTIONS TO THE CLAIMS

3. Please replace claim 21 with the following claim:
Claim 21 (corrected) A method according to claim 20, wherein the imaginary dielectric constant is calculated by taking the square root of the square of the value determined by the POM/SPM ~~or the IBM~~ or the IEM minus the square of the real component of the dielectric value, determined by the DM, that is:

$$\sqrt{\left|\varepsilon_{(POM/SPM \text{ or } IEM)}\right|^2 - \left(\Re(\varepsilon)\right)^2}$$

Signed and Sealed this

Twenty-seventh Day of May, 2008

JON W. DUDAS
*Director of the United States Patent and Trademark Office*